United States Patent [19]
Miller et al.

[11] Patent Number: 5,288,092
[45] Date of Patent: Feb. 22, 1994

[54] ARM POWERED TRICYCLE AND METHOD OF MOVEMENT

[76] Inventors: Amy L. Miller, 1115 Church Dr., Windber, Pa. 15963; Rabon D. Johnson, 572 Jackson Rd., Ligonier, Pa. 15658

[21] Appl. No.: 30,728

[22] Filed: Mar. 12, 1993

[51] Int. Cl.$^5$ .......................... B62M 1/02; B62M 1/14
[52] U.S. Cl. ..................................... 280/244; 280/247; 280/282; 280/288.1
[58] Field of Search .................... 280/242.1, 244, 247, 280/253, 256, 288.1, 93, 95.1, 282,

[56] References Cited

U.S. PATENT DOCUMENTS

| | | |
|---|---|---|
| 31,872 | 4/1861 | Crandall et al. |
| 79,553 | 7/1868 | Crandall |
| 1,287,661 | 12/1918 | Findley ........................ 280/247 |
| 1,327,960 | 1/1920 | Moody |
| 3,149,857 | 9/1964 | May |
| 3,174,767 | 3/1965 | Sendoykas |
| 3,666,292 | 5/1972 | Bartos |
| 3,986,725 | 10/1976 | Terry |
| 4,524,987 | 6/1985 | Kim |
| 4,746,135 | 5/1988 | Oh ............................... 280/282 |
| 4,749,207 | 6/1988 | Oh ............................... 280/282 |

FOREIGN PATENT DOCUMENTS 1027693 2/1953 France ............................ 280/256

*Primary Examiner*—Mitchell J. Hill
*Attorney, Agent, or Firm*—Jon M. Lewis

[57] ABSTRACT

An arm powered tricycle that has a frame with a passenger seat that is capable of forward, backward, or circular motion. The frame has a front wheel that consists of a sphere horizontally and rotatably mounted on an axle that can also rotate about a vertical axis so that it provides universal motion for the front wheel. The rear wheels are independently mounted on separate axles so that they rotate separately from one another. The rear axles are U-shaped in mid section with two concentric and parallel opposing ends that are rotatably mounted on the frame on one end, and are fixedly mounted to the wheel hub on the other end. Vertically pivotal levers are separately and individually furnished and mounted on each lateral side of the frame and are linked with a drive rod to the rear drive axles. The tricycle steers by slowing or stopping both arm levers to lock the rear wheels. Pushing the vertical levers back and forth provides rotation to the rear axles for propulsion. Pivot arrangements are also provided so that the vertical levers may be rotated back against the rear wheels for ease of mounting and dismounting.

8 Claims, 1 Drawing Sheet

ARM POWERED TRICYCLE AND METHOD OF MOVEMENT

BACKGROUND OF THE INVENTION

This invention has to do with tricycles and is especially concerned with tricycles for handicapped children. According to the National Center for Health Statistics, two out of every 1000 children are born with restrictive lower body handicaps. Others through accident or misadventure also have such handicaps and there appears to be no functionally sound tricycle to accommodate these children.

OBJECTS OF THE INVENTION

It is an object of the present invention to provide a relatively inexpensive arm powered tricycle for restricted lower-body handicapped children.

It is an object of the present invention to provide a tricycle that may be powered, steered, and braked by the upper body of a child.

It is an object of the present invention to provide a safe arm powered tricycle for a child.

It is an object of the present invention to provide an arm powered tricycle that has a center of gravity lower than the axle height.

It is an object of the present invention to provide an arm powered tricycle that may be powered by an upper body force of 10-15 foot pounds.

It is an object of the present invention to provide an arm powered tricycle that is safe, stable and durable.

It is an object of the present invention to provide an arm powered tricycle that can carry a child of up to sixty five pounds in weight.

It is a further object of the present invention to provide an arm powered tricycle that has levers, pedals and other moving parts that are adjustable for child growth.

It is a further object of the present invention to an arm powered tricycle that can be conveniently transported, can be mounted and dismounted with ease, has traction on many different surfaces and is built of weather resistant materials.

SUMMARY OF THE INVENTION

An arm powered tricycle that has a frame with a passenger seat that is capable of forward, backward, or circular motion. The frame has a front wheel that consists of a sphere horizontally and rotatably mounted on an axle that can also rotate about a vertical axis so that it provides universal motion for the front wheel. The rear wheels are independently mounted on separate axles so that they rotate separately from one another. The rear axles are U-shaped in mid section with two concentric and parallel opposing ends that are rotatably mounted on the frame on one end, and are fixedly mounted to the wheel hub on the other end. Vertically pivotal levers are separately and individually furnished by pivot means on each lateral side of the frame and are linked with a drive rod to the rear drive axles. The tricycle steers by slowing or stopping both arm levers to lock the rear wheels. Pushing the vertical levers back and forth provides rotation to the rear axles for propulsion. Pivot means are also provided so that the vertical levers may be rotated back against the rear wheels for ease of mounting and dismounting.

According to the present invention there is provided a tricycle which comprises a body frame having forward and rearward portions. A universal wheel assembly depends downwardly from the forward portion of the frame to support the frame on the ground. An adjustable seat on the rearward portion carries the passenger and foot rests extend forwardly on the frame from the adjustable seat. Enlarged diameter rear wheels are located on each lateral side of the rear portion and depend downwardly to support the frame on the ground. Each wheel has an independent axle rotatable on the frame and fixedly attached to the hubs of each individual wheel. Means are provided for rotating each rear wheel and axle independently of the other and the same means may be used for holding each axle non-rotatable independently of the other.

Preferably each rear axle is comprised of two opposite facing and spaced apart parallel, concentric rod sections that are joined together by a U-shaped section. One of the rod sections has an end fixedly attached to the wheel and the other rod section rotatably mounted and held by the frame.

Preferably the means for rotating each rear wheel independently of the other comprises lever means pivotally connected to each lateral side of the frame forwardly of the wheels. Each lever has an upper hand portion for gripping, a pivot connection point on the frame body and a lower portion with a pivotal connection to a wheel drive rod connected to the axle.

Preferably the universal wheel comprises a sphere having a horizontal axis of rotation and a support axle having a vertical axis of rotation. The axle for the spherical wheel comprises a vertical section for rotatable attachment with the forward portion of the frame and a horizontal section for mounting of the sphere with an arcuate section joining the horizontal and vertical sections.

Preferably the universal front wheel and the rear wheels are sized so that the seat on the frame is located below the center of gravity for the tricycle assembly.

The present invention also contemplates the method of propelling a vehicle which comprises the steps of attaching a freely rotating universal wheel at the front of a frame and two independently mounted wheels and axles at the rear of the frame. A seat is placed intermediate of the front universal wheel and the rear wheels and below the center of gravity of the frame and wheels. The rear axle of each of the rear wheels is formed so as to have two parallel and concentric sections with a U-shape section joining the two sections. The method further includes joining one of the axle sections fixedly to the hub of the wheel and the other section rotatably to the frame. A vertical lever means is placed on the frame having an upper hand grip, a lower drive rod connection, and a pivot connection point on the frame. The method includes the step of connecting a drive rod between the lower drive rod connection and the U-shaped axle portion so that movement of the lever means rotates the U-shaped portion of the axle and turns the rear wheel. The method further includes moving the lever means while seated in the tricycle so as to propel the tricycle forward, turn the vehicle, move the vehicle in reverse and to stop the vehicle.

The materials preferred for the construction are plastics, rubber, aluminum, and steel. Preferably the plastic wheels, frame, and body are composed of high density polyethylene, high impact styrene and high impact polypropylene. As is the practice in the toy industry, teflon is added to all the plastic parts during production and the parts are then split injection molded and autoclave seamed. Steel is preferable for the remainder of the parts and steel tubing is preferred for the hand levers in order to maintain the 15-17 foot pounds force.

DETAILED DESCRIPTION OF THE INVENTION

Figure 1:
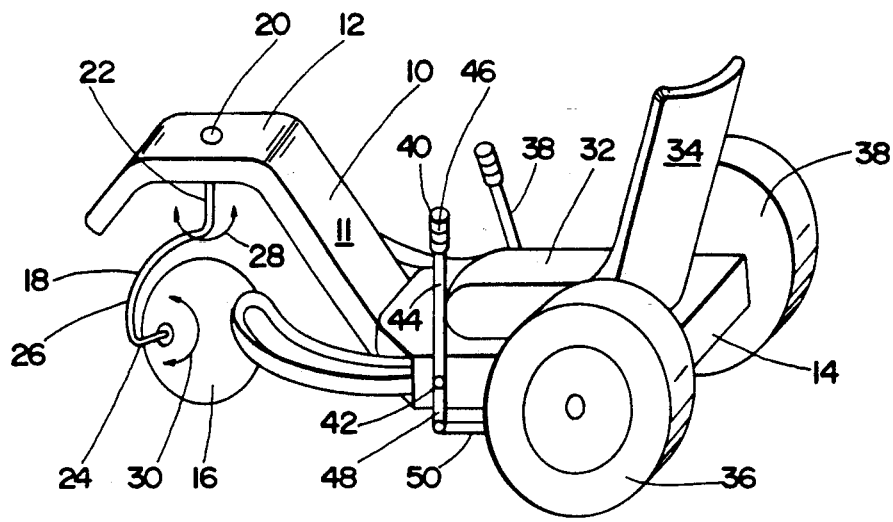
FIG. 1 is a perspective view of the arm powered tricycle according to the present invention.

What is shown in FIG. 1 is an arm powered tricycle 10 having a frame 11, a forward frame portion 12, and rear frame portion 14. A spherical front universal wheel 16 depends downwardly from the forward frame portion 12 and is supported by an axle 18. The axle 18 is rotatably attached at 20 to the forward portion of the frame 12 and comprises a vertical section that rotatably attaches on the forward portion of the frame 12 at 20, a second horizontal section 24 on which the universal wheel 16 is horizontally and rotatably mounted. Joining the sections 22 and 24 is an arcuate section 26 as is shown and the arrow at 28 indicates the degree on freedom of rotation of the section 22 of axle 18, in that it is rotatable around the vertical section 22 in either direction. The spherical wheel 16 is horizontally rotatable in either direction as is indicated by arrow 30.

The rearward portion 14 of t-.he frame 11 has a seat 32 located thereon with a back portion 34 for the seating of a passenger. Seat 32 is adjustable in a forward and back manner, in that it may be moved towards the forward section 12 of frame 11 or towards the rear portion 14 of the frame 11. The rear wheels 36 and 38 are somewhat enlarged in diameter in comparison with the front spherical wheel 16, and vertically extending levers 38 and 40 are mounted on lateral sides of the rear portion 14 of frame 11. The levers 38 and 40 have a pivot point as shown at 42 with the upper section 44 of lever 38 having a hand grip 46 for gripping by the passenger. The lower end 48 of the pivot rod 40 is connected to a wheel drive rod 50 that extends rearwardly and is linked to the axle for rear wheel 36. A similar lever and drive arrangement would be located on the other lateral side for the rear wheel 38.

Figure 2:
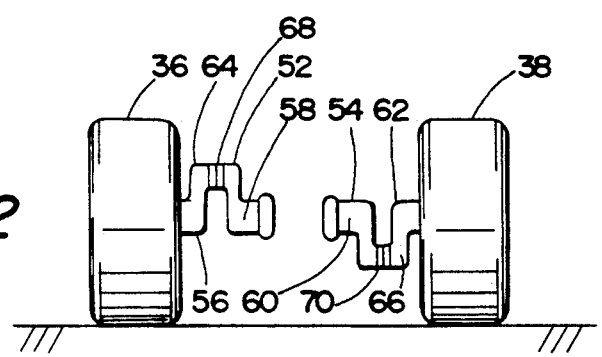
FIG. 2 is a rear view of the rear wheels and axles of the arm powered tricycle according to the present invention.

Shown in FIG. 2 is a rear view of the wheels 36 and 38 having independent axles 52 and 54. The independent axles 52 and 54 have two opposing parallel and concentric sections 56 and 58 respectively for axles 52 and 60 and 62 for axle 54. Joining the parallel and concentric sections 56 and 58 is a U shaped section 64 and a U shaped section 66 on axles 52 and 54 respectively. Bearing knuckle joints 68 and 70 are formed on the U shaped sections 64 and 66 for linkage with a drive rod 50 extending from the vertical levers 38 and 40. The sections 58 and 60 of the axles 52 and 54 are rotatably mounted on the rear portion 14 of frame 11 and have the other ends 56 and 62 fixedly attached to the hub of the wheels 36 and 38, respectively, so that rotation of the axles 52 and 54 will rotate the wheels 36 and 38.

Figure 3:
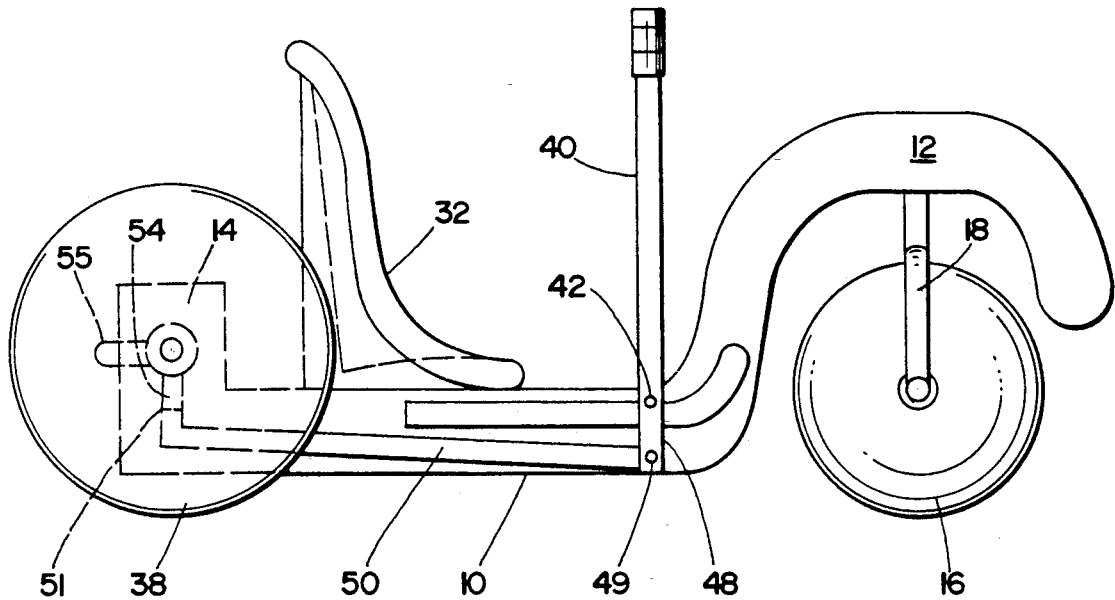
FIG. 3 is a side view of the arm powered tricycle according to the present invention.

Shown in FIG. 3 is the on powered tricycle 10 according to the present invention having the seat 32 shown thereon with the spherical front wheel 16 depending by axle 18 from the front portion 12 of the frame 11. A rear wheel 38 is shown mounted to axle 54 to the frame portion 14 of the frame 11. The vertical lever means 40 is shown pivotally attached at 42 to the frame 11 and has its lower section 48 pivotally attached at 49 to the drive rod 50. Drive rod 50 pivotally attaches at 51 to the axle 54. It should be noted that the seat in this view is located beneath the center line of axles 54 and 52 for the rear wheel 36 and 38 in order to provide for stability of the vehicle. The vehicle in FIG. 3 is propelled by pushing forward on the vertical lever forward so as to push the axle 54 rearwardly until it reaches position 55, at which point momentum of the axle 54 will continue in a clockwise direction as long as forward propulsion is desired and the lever is coordinately moved back and forth. When it is desired to stop the vehicle from forward propulsion one only has to lock the lever 40 by holding it in a firm position and forward momentum of the vehicle 10 will cease. In the same manner controlling the speed of the individual rear wheels 36 and 38 through the levers 38 and 40 will control the steering of the vehicle as well as controlling its turning ability. Of course vehicle 10 may also be driven in reverse by reversing the operations of the levers 38 and 40 as has been previously described.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

We claim:

1. A tricycle which comprises:
   a. a body frame having forward and rearward portions;
   b. a universal wheel assembly depending downward from the forward portion of said frame to support said frame on the ground;
   c. an adjustable seat on said rearward portion and foot rests extending forwardly on said frame from said adjustable seat;
   d. rear wheels on each lateral side of said rear portion depending downwardly to support said frame off said ground;
   e. each wheel having an independent axle rotatable on said frame and fixedly attached to the hubs of said wheels;
   f. means for rotating each rear wheel and axle independently of the other and means for holding each axle non-rotatable independently of the other.

2. The tricycle according to claim 1 in which each axle is comprised of two spaced apart parallel and concentric rod sections and joined together by a U-shaped section, with one of the rod sections fixedly attaching to said wheel and the other rod section rotatably held by said frame.

3. The tricycle according to claim 1 in which said means for rotating each rear wheel independently of the other comprises lever means pivotally connected to each lateral side of said frame forwardly of said wheels, with each said lever having an upper hand portion for gripping, a pivot point on said frame body and a lower portion with a pivotal connection to a wheel drive rod connected too said axle.

4. The tricycle according to claim 2 in which said means for rotating each rear wheel independently of the other comprises lever means pivotally connected to each lateral side of said frame forwardly of said wheels, with each said lever having an upper hand portion for gripping, a pivot point on said frame body and a lower portion with a pivotal connection to a wheel drive rod connected to the U-shaped section of said axle.

5. The tricycle according to claim 1 in which said universal wheel comprises a sphere having a horizontal axis of rotation and a support axle having a vertical axis of rotation.

6. The tricycle according to claim 5 in which said axle for said sphere comprises a vertical section for rotatable attachment with said forward portion of said frame and a horizontal section for mounting of the sphere and an arcuate section joining said horizontal and vertical sections.

7. The tricycle according to claim 1 in which said universal front wheel and said rear wheels are sized so that said seat on said frame is located below the center of gravity for the tricycle assembly.

8. The method of propelling a vehicle which comprises the steps of:

a. attaching a freely rotating universal wheel at the front of a frame and two independently mounted wheels and axles at the rear of a frame;
b. placing a seat intermediate of said front universal wheel and said rear wheels and below the center of gravity of the frame and wheels;
c. forming each axle of said rear wheels so as to have two parallel and concentric sections with a U-shape section joining said two sections and joining one of said sections fixedly to the hub of the wheel and the other section rotatably to the frame;
d. placing vertical lever means for propelling the vehicle on said frame having an upper hand grip and a lower drive rod connection and a pivot point on said frame;
e. connecting a drive rod between the lower drive rod connection and said U-shaped axle portion so that movement of the lever means rotates the U-shaped portion of the axle and turns the wheel it is connected to;
f. moving said lever means while seated in said vehicle so as to propel the vehicle forward, turn the vehicle, move the vehicle in reverse and to stop the vehicle.

* * * * *